(12) United States Patent
Lewis (10) Patent No.: US 7,549,406 B2
(45) Date of Patent: Jun. 23, 2009

(54) ENGINE SHUT-DOWN FOR ENGINE HAVING ADJUSTABLE VALVE TIMING

(75) Inventor: Donald J. Lewis, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/968,313

(22) Filed: Jan. 2, 2008

(65) Prior Publication Data

US 2008/0098980 A1 May 1, 2008

Related U.S. Application Data (60) Division of application No. 11/379,755, filed on Apr. 21, 2006, now Pat. No. 7,317,984, which is a division of application No. 11/079,968, filed on Mar. 14, 2005, now Pat. No. 7,047,126, which is a continuation-in-part of application No. 10/805,648, filed on Mar. 19, 2004, now Pat. No. 7,021,289.

(51) Int. Cl.
*F02D 13/06* (2006.01)

(52) U.S. Cl. .............................. 123/198 F; 123/90.11; 123/322; 123/347

(58) Field of Classification Search ................. 123/322, 123/347, 90.11, 198 D, 198 F; 701/112
See application file for complete search history.

(56) References Cited

U.S. PATENT DOCUMENTS

| | | | |
|---|---|---|---|
| 3,828,247 A | 8/1974 | Kirsch et al. |
| 3,865,088 A | 2/1975 | Links |
| 4,009,695 A | 3/1977 | Ule |
| 4,129,040 A | 12/1978 | Hayden, Jr. |
| 4,732,117 A | 3/1988 | Tanahashi et al. |
| 4,779,528 A | 10/1988 | Bruke |
| 4,794,891 A | 1/1989 | Knobloch |
| 4,807,495 A | 2/1989 | Wallace |
| 4,848,284 A | 7/1989 | Konno |

(Continued)

FOREIGN PATENT DOCUMENTS

DE 2063158 6/1972

(Continued)

OTHER PUBLICATIONS

Kluting, Manfred et al. "Throttle-free load control with fully variable valve drives (Drosselfreie Laststeuerung mit vollvariablen Ventiltrieben)." MTZ—Motortechnische Zeitschrift (magazine), Aug. 1999.

(Continued)

*Primary Examiner*—Hai H Huynh
(74) *Attorney, Agent, or Firm*—Allan J. Lippa; Alleman Hall McCoy Russell & Tuttle LLP (57) ABSTRACT

A method for discontinuing combustion in a cylinder of an internal combustion engine having an intake manifold and an emission control device coupled downstream of thereof, where the cylinder has at least one valve, the method comprising during a shut-down and after a final combustion event in the cylinder, adjusting valve timing of the valve to reduce a flow of gasses from the engine to the emission control device.

16 Claims, 9 Drawing Sheets

U.S. PATENT DOCUMENTS

| | | | |
|---|---|---|---|
| 4,926,823 A | 5/1990 | Kishi et al. |
| 4,945,870 A | 8/1990 | Richeson |
| 4,965,741 A | 10/1990 | Cook et al. |
| 4,976,228 A | 12/1990 | Kawamura |
| 4,990,854 A | 2/1991 | Friz |
| 5,016,494 A | 5/1991 | Yamaguchi |
| 5,072,700 A | 12/1991 | Kawamura |
| 5,072,702 A | 12/1991 | Sasaki et al. |
| 5,117,790 A | 6/1992 | Clarke et al. |
| 5,123,397 A | 6/1992 | Richeson |
| 5,129,369 A | 7/1992 | Kawamura |
| 5,190,013 A | 3/1993 | Dozier |
| 5,201,296 A | 4/1993 | Wunning et al. |
| 5,216,987 A | 6/1993 | Clarke |
| 5,219,397 A | 6/1993 | Jones |
| 5,236,332 A | 8/1993 | Satou et al. |
| 5,280,770 A | 1/1994 | Satou et al. |
| 5,284,116 A | 2/1994 | Richeson, Jr. |
| 5,357,916 A | 10/1994 | Matterazzo |
| 5,408,958 A | 4/1995 | Esch et al. |
| 5,422,811 A | 6/1995 | Togai |
| 5,442,515 A | 8/1995 | Wallaert |
| 5,496,229 A | 3/1996 | Miyamoto |
| 5,515,828 A | 5/1996 | Cook et al. |
| 5,540,633 A | 7/1996 | Yamanaka et al. |
| 5,548,514 A | 8/1996 | Hasegawa et al. |
| 5,555,871 A | 9/1996 | Gopp et al. |
| 5,596,956 A | 1/1997 | Ogawa et al. |
| 5,600,056 A | 2/1997 | Hasegawa et al. |
| 5,617,829 A | 4/1997 | Bidner et al. |
| 5,636,601 A | 6/1997 | Moriya et al. |
| 5,647,312 A | 7/1997 | Salber et al. |
| 5,669,341 A | 9/1997 | Ushirono et al. |
| 5,673,676 A | 10/1997 | Mukumoto |
| 5,678,402 A | 10/1997 | Kitagawa et al. |
| 5,743,221 A | 4/1998 | Schmitz |
| 5,746,183 A | 5/1998 | Parke et al. |
| 5,765,514 A | 6/1998 | Sono et al. |
| 5,803,040 A | 9/1998 | Biesinger et al. |
| 5,921,216 A | 7/1999 | Ballman et al. |
| 5,930,992 A | 8/1999 | Esch et al. |
| 5,934,231 A | 8/1999 | Schmitz et al. |
| 5,947,095 A | 9/1999 | Kato |
| 5,950,603 A | 9/1999 | Cook et al. |
| 5,957,095 A | 9/1999 | Kako |
| 5,975,052 A | 11/1999 | Moyer |
| 5,992,153 A | 11/1999 | Tsuchihashi et al. |
| 6,000,376 A | 12/1999 | Hess et al. |
| 6,023,929 A | 2/2000 | Ma |
| 6,039,026 A | 3/2000 | Shiraishi et al. |
| 6,050,231 A | 4/2000 | Tisch et al. |
| 6,062,186 A | 5/2000 | Barnes et al. |
| 6,076,491 A | 6/2000 | Allen |
| 6,085,717 A | 7/2000 | Kawamura et al. |
| 6,098,585 A | 8/2000 | Brehob et al. |
| 6,109,225 A | 8/2000 | Ogita et al. |
| 6,116,210 A | 9/2000 | Oder et al. |
| 6,138,636 A | 10/2000 | Kohno et al. |
| 6,178,934 B1 | 1/2001 | Hirasawa et al. |
| 6,192,857 B1 | 2/2001 | Shimada |
| 6,202,608 B1 | 3/2001 | Yamaki et al. |
| 6,216,652 B1 | 4/2001 | Gramann et al. |
| 6,217,480 B1 | 4/2001 | Iwata et al. |
| 6,219,611 B1 | 4/2001 | Russell et al. |
| 6,220,223 B1 | 4/2001 | Weisman, II et al. |
| 6,223,846 B1 | 5/2001 | Schechter |
| 6,247,445 B1 | 6/2001 | Langer |
| 6,247,449 B1 | 6/2001 | Persson |
| 6,250,266 B1 | 6/2001 | Okui et al. |
| 6,260,525 B1 | 7/2001 | Moyer |
| 6,269,632 B1 | 8/2001 | Schmitz |
| 6,276,316 B1 | 8/2001 | Arai et al. |
| 6,286,478 B1 | 9/2001 | Atago et al. |
| 6,311,667 B1 | 11/2001 | Satou et al. |
| 6,321,700 B1 | 11/2001 | Hein et al. |
| 6,330,870 B1 | 12/2001 | Inoue et al. |
| 6,332,445 B1 | 12/2001 | Voss et al. |
| 6,332,446 B1 | 12/2001 | Matsumoto et al. |
| 6,333,843 B2 | 12/2001 | Boie et al. |
| 6,336,355 B1 | 1/2002 | Sasaki et al. |
| 6,336,436 B1 | 1/2002 | Miyakubo et al. |
| 6,341,487 B1 | 1/2002 | Takahashi et al. |
| 6,341,584 B1 | 1/2002 | Itoyama et al. |
| 6,349,541 B1 | 2/2002 | Gruden et al. |
| 6,363,907 B1 | 4/2002 | Arai et al. |
| 6,367,437 B2 | 4/2002 | Nakamura et al. |
| 6,374,783 B1 | 4/2002 | Toriumi |
| 6,374,813 B1 | 4/2002 | Iida et al. |
| 6,382,193 B1 | 5/2002 | Boyer et al. |
| 6,386,156 B1 | 5/2002 | Stockhausen et al. |
| 6,389,806 B1 | 5/2002 | Glugla et al. |
| 6,390,038 B1 | 5/2002 | Di Lieto et al. |
| 6,390,063 B1 | 5/2002 | Obata et al. |
| 6,397,813 B1 | 6/2002 | Han et al. |
| 6,401,026 B2 | 6/2002 | Robichaux et al. |
| 6,401,684 B2 | 6/2002 | Hori et al. |
| 6,408,625 B1 | 6/2002 | Woon et al. |
| 6,408,806 B2 | 6/2002 | Suglyama et al. |
| 6,415,601 B1 | 7/2002 | Glugla et al. |
| 6,422,185 B1 | 7/2002 | Duesmann et al. |
| 6,425,369 B2 | 7/2002 | Arai et al. |
| 6,431,129 B1 | 8/2002 | Hammoud et al. |
| 6,431,130 B1 | 8/2002 | Leone et al. |
| 6,435,147 B1 | 8/2002 | Eichenseher et al. |
| 6,443,108 B1 | 9/2002 | Brehob et al. |
| 6,446,588 B2 | 9/2002 | Yamada et al. |
| 6,453,662 B1 | 9/2002 | Lewis et al. |
| 6,453,665 B1 | 9/2002 | Bower, Jr. et al. |
| 6,457,465 B2 | 10/2002 | Lee |
| 6,460,500 B1 | 10/2002 | Ooyama et al. |
| 6,470,853 B1 | 10/2002 | Leone et al. |
| 6,474,303 B1 | 11/2002 | Leone et al. |
| 6,481,201 B2 | 11/2002 | Kako et al. |
| 6,484,677 B2 | 11/2002 | Leone et al. |
| 6,497,093 B1 | 12/2002 | Lewis et al. |
| 6,502,389 B2 | 1/2003 | Katayama et al. |
| 6,505,113 B2 | 1/2003 | Eichenseher et al. |
| 6,510,824 B2 | 1/2003 | Vorih et al. |
| 6,513,319 B2 | 2/2003 | Nozawa et al. |
| 6,513,493 B1 | 2/2003 | Robichaux et al. |
| 6,519,933 B2 | 2/2003 | Ogiso et al. |
| 6,523,504 B2 | 2/2003 | Miura |
| 6,526,745 B1 | 3/2003 | Ogiso |
| 6,532,944 B1 | 3/2003 | Leone et al. |
| 6,546,910 B2 | 4/2003 | Tanaka et al. |
| 6,550,240 B2 | 4/2003 | Kolmanovsky et al. |
| 6,550,434 B2 | 4/2003 | Leone et al. |
| 6,553,961 B2 | 4/2003 | Hammoud et al. |
| 6,557,505 B1 | 5/2003 | Hori |
| 6,568,177 B1 | 5/2003 | Surnilla |
| 6,591,605 B2 | 7/2003 | Lewis |
| 6,594,987 B2 | 7/2003 | Uranishi |
| 6,595,183 B1 | 7/2003 | Olofsson |
| 6,619,245 B1 | 9/2003 | Fujiwara et al. |
| 6,619,262 B2 | 9/2003 | Graf et al. |
| 6,620,076 B1 | 9/2003 | Kawamura |
| 6,629,024 B2 | 9/2003 | Tabata et al. |
| 6,629,409 B2 | 10/2003 | Lewis et al. |
| 6,637,386 B2 | 10/2003 | Murata et al. |
| 6,640,756 B2 | 11/2003 | Ogiso |
| 6,644,265 B2 | 11/2003 | Parker et al. |
| 6,647,947 B2 | 11/2003 | Boyer et al. |
| 6,655,353 B1 | 12/2003 | Rayl |
| 6,681,173 B2 | 1/2004 | Turner et al. |

| | | |
|---|---|---|
| 6,691,021 B2 | 2/2004 | Takagi et al. |
| 6,701,887 B2 | 3/2004 | Salber et al. |
| 6,718,928 B2 | 4/2004 | Brueggen et al. |
| 6,718,937 B2 | 4/2004 | Kim |
| 6,735,938 B2 | 5/2004 | Surnilla |
| 6,736,121 B2 | 5/2004 | Gopichandra |
| 6,761,147 B2 | 7/2004 | Majima |
| 6,763,707 B2 | 7/2004 | Kumagai et al. |
| 6,766,641 B1 | 7/2004 | Surnilla et al. |
| 6,772,723 B2 | 8/2004 | Aoki et al. |
| 6,776,134 B2 | 8/2004 | Wildner |
| 6,785,603 B2 | 8/2004 | Inoue |
| 6,799,421 B2 | 10/2004 | Surnilla |
| 6,808,471 B1 | 10/2004 | Bauerle et al. |
| 6,832,977 B2 | 12/2004 | You |
| 6,837,040 B2 | 1/2005 | Sonoda et al. |
| 6,854,449 B2 | 2/2005 | Iino et al. |
| 6,857,264 B2 | 2/2005 | Ament |
| 6,866,012 B2 | 3/2005 | Hayase et al. |
| 6,883,319 B2 | 4/2005 | Ekenberg |
| 6,898,927 B2 | 5/2005 | Morinaga et al. |
| 6,907,725 B2 | 6/2005 | Szymkowicz et al. |
| 6,912,995 B2 | 7/2005 | Miura |
| 6,935,295 B2 | 8/2005 | Marriott |
| 6,938,598 B1 | 9/2005 | Lewis et al. |
| 6,955,144 B2 | 10/2005 | Sakai et al. |
| 6,975,935 B2 | 12/2005 | Kohler et al. |
| 7,011,075 B2 * | 3/2006 | Lewis .................. 123/437 |
| 7,017,539 B2 | 3/2006 | Lewis et al. |
| 7,021,289 B2 | 4/2006 | Lewis et al. |
| 7,027,911 B2 | 4/2006 | Nishikawa et al. |
| 7,028,650 B2 | 4/2006 | Lewis et al. |
| 7,031,821 B2 | 4/2006 | Lewis et al. |
| 7,032,545 B2 | 4/2006 | Lewis et al. |
| 7,032,581 B2 | 4/2006 | Gibson et al. |
| 7,047,126 B2 * | 5/2006 | Lewis .................. 701/112 |
| 7,051,700 B2 | 5/2006 | Kuzuyama et al. |
| 7,055,483 B2 | 6/2006 | Lewis et al. |
| 7,063,062 B2 | 6/2006 | Lewis et al. |
| 7,066,121 B2 | 6/2006 | Michelini et al. |
| 7,072,758 B2 | 7/2006 | Kolmanovsky et al. |
| 7,079,935 B2 | 7/2006 | Lewis et al. |
| 7,107,946 B2 | 9/2006 | Lewis et al. |
| 7,107,947 B2 | 9/2006 | Lewis et al. |
| 7,128,043 B2 | 10/2006 | Lewis et al. |
| 7,128,687 B2 | 10/2006 | Lewis |
| 7,140,655 B2 | 11/2006 | Michelini et al. |
| 7,143,727 B1 | 12/2006 | Winstead et al. |
| 7,165,391 B2 | 1/2007 | Lewis |
| 7,179,199 B2 | 2/2007 | Kushiyama et al. |
| 7,240,663 B2 * | 7/2007 | Lewis et al. .................. 123/321 |
| 7,317,984 B2 * | 1/2008 | Lewis .................. 701/112 |
| 7,392,786 B2 * | 7/2008 | Lewis et al. .................. 123/347 |
| 2001/0003971 A1 | 6/2001 | Hori et al. |
| 2001/0023667 A1 | 9/2001 | Miura |
| 2001/0050065 A1 | 12/2001 | Yamada et al. |
| 2002/0038541 A1 | 4/2002 | Surnilla et al. |
| 2002/0096139 A1 | 7/2002 | Zheng |
| 2002/0157630 A1 | 10/2002 | Gerhard et al. |
| 2002/0189576 A1 | 12/2002 | Wildner |
| 2003/0015026 A1 | 1/2003 | Chung |
| 2003/0036458 A1 | 2/2003 | Tabata et al. |
| 2003/0051465 A1 | 3/2003 | Kolmanovsky et al. |
| 2003/0070423 A1 | 4/2003 | Morinaga et al. |
| 2003/0073540 A1 | 4/2003 | Eguchi et al. |
| 2003/0106515 A1 | 6/2003 | Kondo |
| 2003/0131820 A1 | 7/2003 | McKay et al. |
| 2003/0172892 A1 | 9/2003 | Glugla et al. |
| 2004/0083719 A1 | 5/2004 | Xu et al. |
| 2004/0098970 A1 | 5/2004 | Foster |
| 2004/0103867 A1 | 6/2004 | Hayase et al. |
| 2004/0206068 A1 | 10/2004 | Michelini |
| 2005/0028515 A1 | 2/2005 | Fukama et al. |
| 2005/0166900 A1 | 8/2005 | Song et al. |
| 2005/0199220 A1 | 9/2005 | Ogiso |
| 2005/0204727 A1 | 9/2005 | Lewis et al. |
| 2005/0205048 A1 | 9/2005 | Winstead et al. |
| 2005/0205049 A1 | 9/2005 | Lewis |
| 2005/0205069 A1 | 9/2005 | Lewis et al. |
| 2005/0268880 A1 | 12/2005 | Bidner et al. |
| 2006/0118087 A1 * | 6/2006 | Lewis et al. .................. 123/437 |
| 2006/0154784 A1 | 7/2006 | Surnilla et al. |
| 2006/0201458 A1 | 9/2006 | Lewis |

FOREIGN PATENT DOCUMENTS

| | | |
|---|---|---|
| DE | 4445779 | 6/1996 |
| EP | 0717172 | 6/1996 |
| EP | 1002939 | 5/2000 |
| EP | 1136661 | 9/2001 |
| EP | 1054148 | 4/2002 |
| EP | 1209341 | 5/2002 |
| EP | 13752410 | 1/2004 |
| EP | 1388450 | 2/2004 |
| FR | 2769050 | 4/1999 |
| JP | 55-29002 | 3/1980 |
| JP | 55-49549 | 4/1980 |
| JP | 59162312 | 9/1984 |
| JP | 11324744 | 11/1999 |
| WO | 03/021100 | 3/2003 |
| WO | WO 03019003 | 3/2003 |

OTHER PUBLICATIONS

Koopmans, Lucien et al. "A Four Stroke Camless Engine, Operated in Homogeneous Charge Compression Ignition Mode with Commerical Gasoline." SAE Technical Paper Series, No. 2001-01-3610, Sep. 2001.

Pierik, Ronald J. et al. "Design and Development of a Mechanical Variable Valve Actuation System." SAE Technical Paper Series, No. 2000-01-1221, Mar. 2000.

Pischinger, Martin et al. "Benefits of the Electromechanical Valve Train in Vehicle Operation." SAE Technical Paper Series, No. 2000-01-1223, Mar. 2000.

Salber, Wolfgang et al. "Synergies of Variable Valve Actuation and Direct Injection." SAE Technical Paper Series, No. 2002-01-0706, Mar. 2002.

Van Nieuwstadt, M.J. et al. "Air Change Estimation in Camless Engines." SAE Technical Paper Series, No. 2001-01-0581, Mar. 2001.

"Operation of the Electronic Valve Actuation; Ford EVA Project Closed Loop Engine; System Control." Preliminary Version III (manual), Mar. 21, 2003.

European Patent Office, European Search Report of EP05004350, Oct. 22, 2008, EPO.

European Patent Office, European Search Report of EP05004351, Oct. 29, 2008, EPO.

European Patent Office, European Search Report of EP05004851, Nov. 20, 2008, EPO.

* cited by examiner

ENGINE SHUT-DOWN FOR ENGINE HAVING ADJUSTABLE VALVE TIMING

The present application is a divisional of U.S. patent application Ser. No. 11/379,755, filed on Apr. 21, 2006, which is a divisional of U.S. patent application Ser. No. 11/079,968, filed on Mar. 14, 2005, which is a continuation-in-part of U.S. patent application Ser. No. 10/805,648, filed Mar. 19, 2004, the entire contents of each are incorporated herein by reference in their entirety for all purposes.

FIELD

The present description relates to a method for improving a shut-down of an internal combustion engine and more particularly to a method for controlling electromechanical intake and/or exhaust valves to improve shut-down and re-starting of an internal combustion engine.

BACKGROUND AND SUMMARY

The inventors herein have recognized that the number of cycles completed by an engine during an engine shutdown can affect emissions on subsequent engine starts. Specifically, after fuel injection is stopped, the engine may continue to rotate, thus pumping lean gasses to the catalyst thereby increasing its oxidation state. Then, during subsequent restarts, the oxidized catalyst may perform less efficiently.

In one example, this can be addressed by a method for operating at least an intake and exhaust valve in a cylinder with a piston of an engine in a vehicle, comprising:

during conditions of an engine shut-down, maintaining at least one of the intake and exhaust valves in a closed position during a period, and during at least said period where said at least one valve is in said closed position: operating with the other of the intake and exhaust valve open, then closing the other of the intake and exhaust valve, and then opening the other of the intake and exhaust valve to generate braking torque to slow the engine.

It this way, it may be possible to reduce stopping engine stopping time and thereby pump fewer gasses through the catalyst. Further, other advantages may be obtained as discussed in detail below.

DETAILED DESCRIPTION

Figure 1:
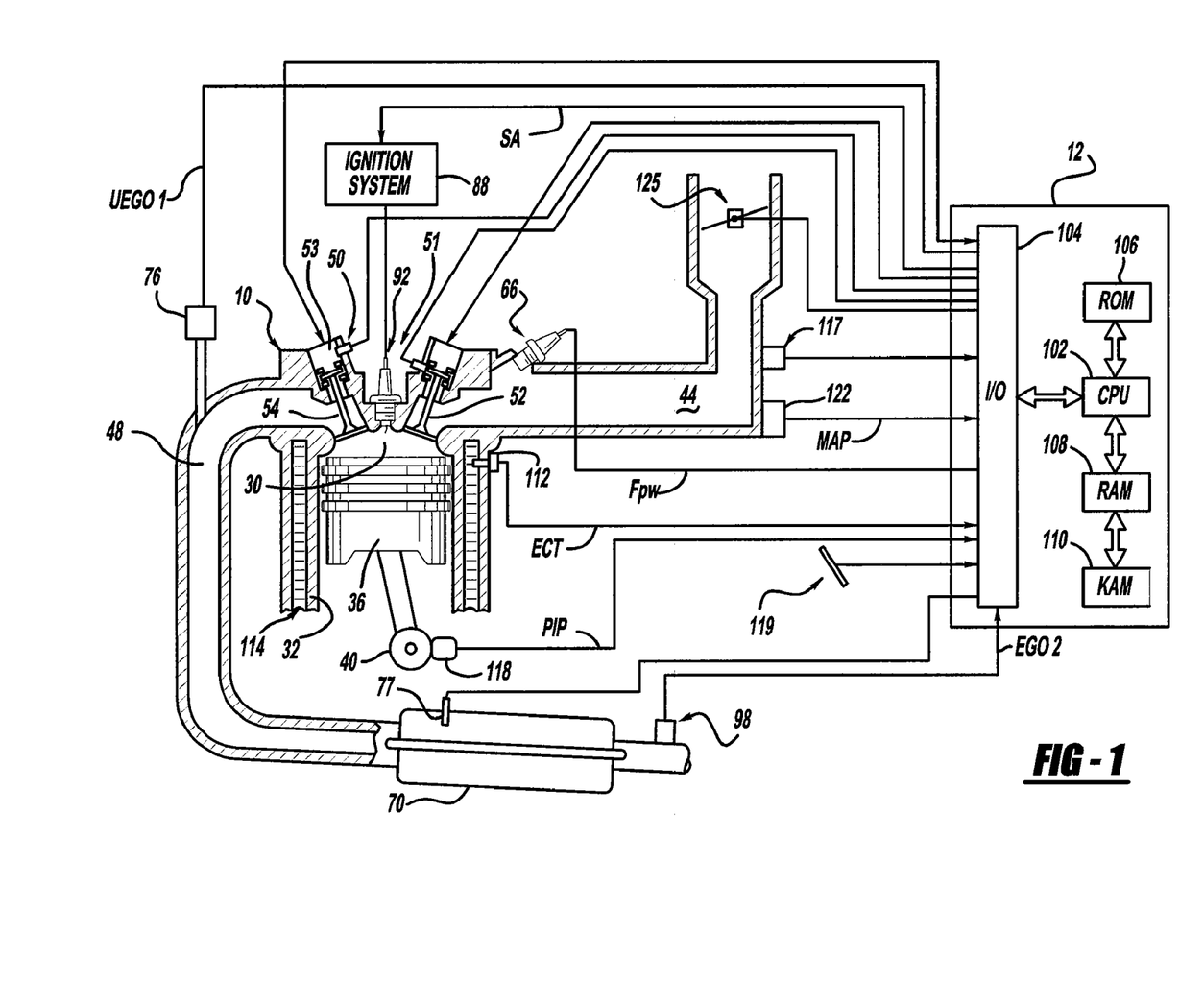
FIG. 1 is a schematic diagram of an engine.
Figure 1A:
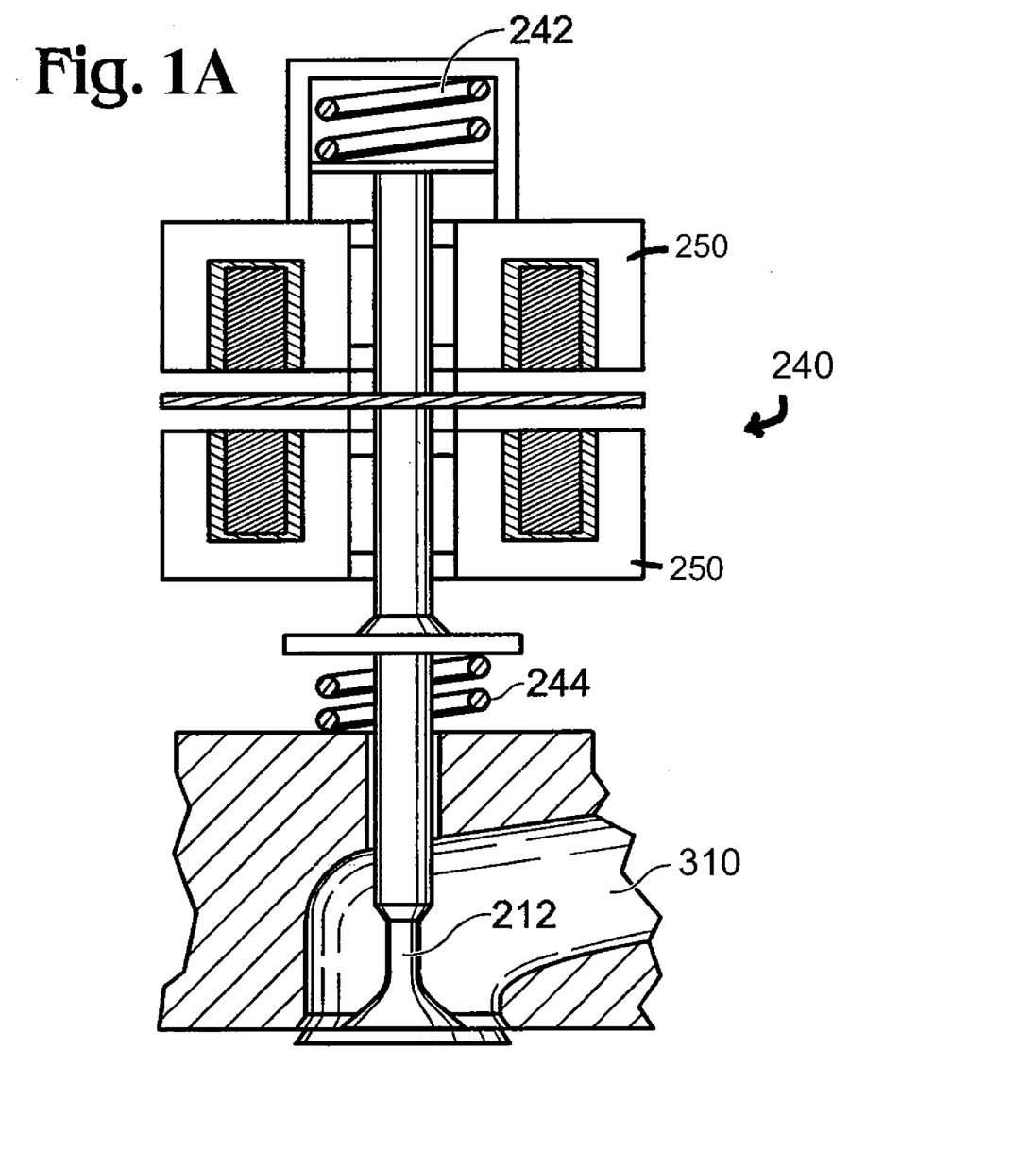
FIG. 1A is a schematic diagram of an engine valve.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 an exhaust valve 54. Each intake and exhaust valve is operated by an electromechanically controlled valve coil and armature assembly 53, such as shown in FIG. 1A. Armature temperature is determined by temperature sensor 51. Valve position is determined by position sensor 50. In an alternative example, each of valves actuators for valves 52 and 54 has a position sensor and a temperature sensor. In still another alternative, one or more of intake valve 52 and/or exhaust valve 54 may be cam actuated, and be capable of mechanical deactivation. For example, lifters may include deactivation mechanism for push-rod type cam actuated valves. Alternatively, deactivators in an overhead cam may be used, such as by switching to a zero-lift cam profile.

Intake manifold 44 is also shown having fuel injector 66 coupled thereto for delivering liquid fuel in proportion to the pulse width of signal FPW from controller 12. Fuel is delivered to fuel injector 66 by fuel system (not shown) including a fuel tank, fuel pump, and fuel rail (not shown). Alternatively, the engine may be configured such that the fuel is injected directly into the engine cylinder, which is known to those skilled in the art as direct injection. In addition, intake manifold 44 is shown communicating with optional electronic throttle 125.

Distributorless ignition system 88 provides ignition spark to combustion chamber 30 via spark plug 92 in response to controller 12. Universal Exhaust Gas Oxygen (UEGO) sensor 76 is shown coupled to exhaust manifold 48 upstream of catalytic converter 70. Alternatively, a two-state exhaust gas oxygen sensor may be substituted for UEGO sensor 76. Two-state exhaust gas oxygen sensor 98 is shown coupled to exhaust manifold 48 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, and read-only memory 106, random access memory 108, 110 keep alive memory, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 119 coupled to a accelerator pedal; a measurement of engine manifold pressure (MAP) from pressure sensor 122 coupled to intake manifold 44; a measurement (ACT) of engine air amount temperature or manifold temperature from temperature sensor 117; and a engine position sensor from a Hall effect sensor 118 sensing crankshaft 40 position. In a preferred aspect of the present description, engine position sensor 118 produces a predetermined number of equally spaced pulses every revolution of the crankshaft from which engine speed (RPM) can be determined.

In an alternative embodiment, a direct injection type engine can be used where injector 66 is positioned in combustion chamber 30, either in the cylinder head similar to spark plug 92, or on the side of the combustion chamber. Also, the engine may be coupled to an electric motor/battery system in a hybrid vehicle. The hybrid vehicle may have a parallel configuration, series configuration, or variation or combinations thereof.

FIG. 1A shows an example dual coil oscillating mass actuator 240 with an engine valve actuated by a pair of opposing electromagnets (solenoids) 250, 252, which are designed to overcome the force of a pair of opposing valve springs 242 and 244. FIG. 1A also shows port 310, which can be an intake or exhaust port). Applying a variable voltage to the electromagnet's coil induces current to flow, which controls the force produced by each electromagnet. Due to the design illustrated, each electromagnet that makes up an actuator can only produce force in one direction, independent of the polarity of the current in its coil. High performance control and efficient generation of the required variable voltage can therefore be achieved by using a switch-mode power electronic converter. Alternatively, electromagnets with permanent magnets may be used that can be attracted or repelled.

As illustrated above, the electromechanically actuated valves in the engine remain in the half open position when the actuators are de-energized. Therefore, prior to engine combustion operation, each valve goes through an initialization cycle. During the initialization period, the actuators are pulsed with current, in a prescribed manner, in order to establish the valves in the fully closed or fully open position. Following this initialization, the valves are sequentially actuated according to the desired valve timing (and firing order) by the pair of electromagnets, one for pulling the valve open (lower) and the other for pulling the valve closed (upper).

The magnetic properties of each electromagnet are such that only a single electromagnet (upper or lower) need be energized at any time. Since the upper electromagnets hold the valves closed for the majority of each engine cycle, they are operated for a much higher percentage of time than that of the lower electromagnets.

While FIG. 1A appears show the valves to be permanently attached to the actuators, in practice there can be a gap to accommodate lash and valve thermal expansion.

As will be appreciated by one of ordinary skill in the art, the specific routines described below in the flowcharts may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the disclosure, but is provided for ease of illustration and description. Although not explicitly illustrated, one of ordinary skill in the art will recognize that one or more of the illustrated steps or functions may be repeatedly performed depending on the particular strategy being used. Further, these Figures graphically represent code to be programmed into the computer readable storage medium in controller 12.

Figure 2:
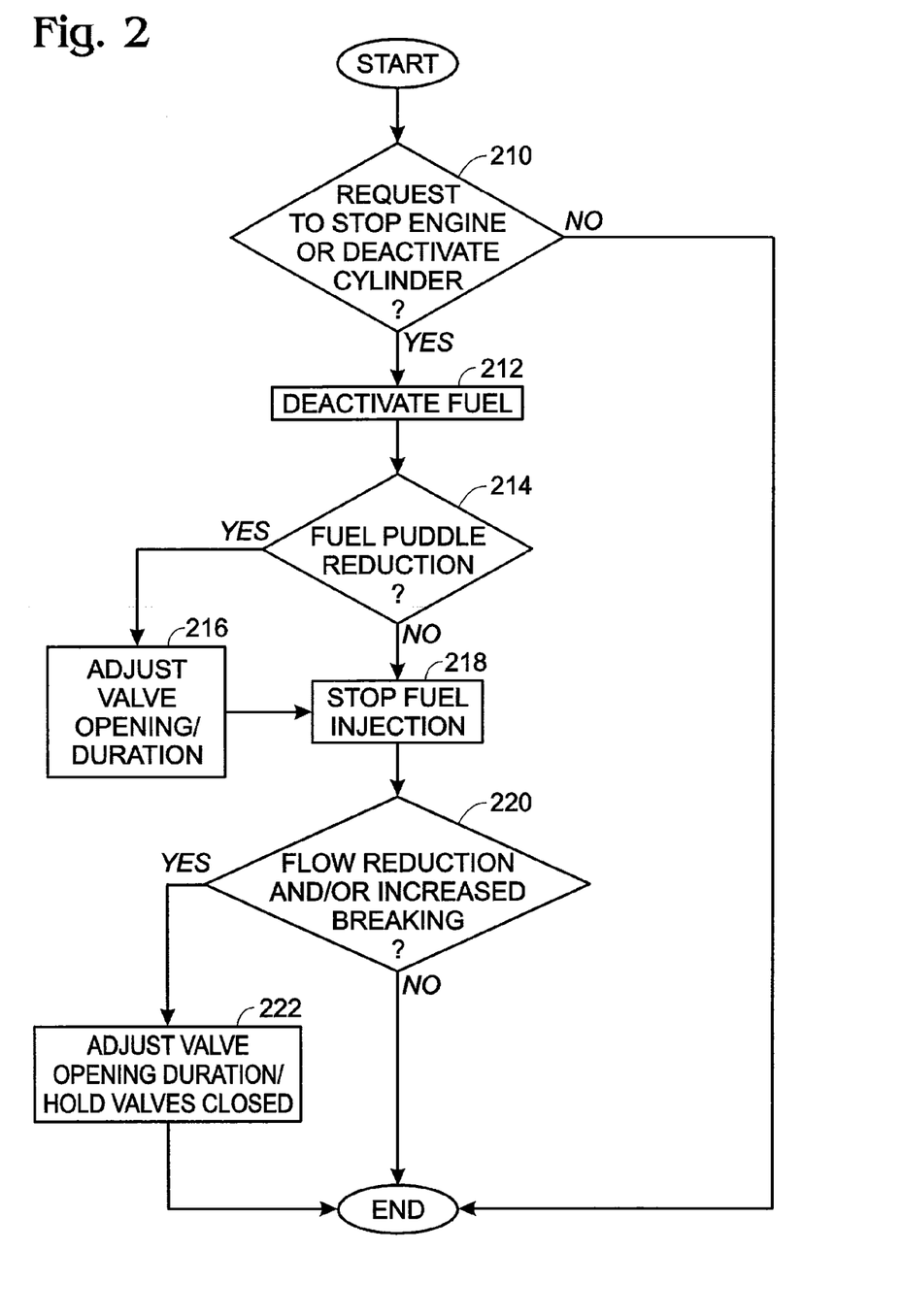
FIG. 2 is a flowchart of a method to control valve timing after a request to stop an engine or to deactivate a cylinder.

Referring now to FIG. 2, a routine is described for controlling an engine shut down. Various features may be used during the engine shut-down. The shut-down may be a vehicle shut-down (such as key-off), an engine shut-down such as during a pure electric mode of a hybrid powertrain, or a partial engine shut-down (e.g., one or more cylinder deactivated). These features may include adjusting valve opening/closing timing during the shut-down to draw a larger amount of a fuel puddle into the cylinder for combustion. They may also include adjusting valve opening/closing timing during the shut-down to increase engine braking to achieve a faster engine stopping time. Further, they may also include holding some valves (e.g., intake and/or exhaust) closed to reduce a flow of pumped gasses through the exhaust system during the shut-down. Further still, various combinations of these features may be used.

Referring now specifically to FIG. 2, in step 210 the routine determines if a request has been made to stop the engine or deactivate one or more cylinders. The request may be initiated by the driver of the vehicle or from within the vehicle control architecture, such as a hybrid-electric vehicle. If a request is present the routine proceeds to step 212. If no request is present the routine proceeds to exit.

In step 212, fuel is deactivated to individual cylinders based on the combustion order of the engine. That is, fuel injections that are in progress complete injection, and then fuel is deactivated. Then, in step 214 a determination is made as to whether fuel puddle reduction adjustments should be made. If so, in step 216, calculations that determine the cylinder port fuel puddle mass continue and the intake valve duration are adjusted to produce the desired air-fuel ratio. Fuel puddle mass is determined with the method in accordance with U.S. Pat. No. 5,746,183 and is hereby fully incorporated by reference. In addition, spark may be adjusted in this step based on the request to stop the engine. In one example, spark is adjusted to a value retarded from MBT (minimum advance for best torque) to reduce engine hydrocarbons and increase exhaust heat. For example, adjusting spark during shut-down, catalyst temperature may be increased so that if the engine is restarted sometime soon, higher catalyst conversion efficiency may be achieved, due to a higher catalyst temperature. In another example, retarding spark during engine shut-down may reduce evaporative emissions. Since hydrocarbon concentrations in exhaust gas may be reduced, exhaust gases that escape to the atmosphere during an engine stop may have fewer hydrocarbons.

Thus, in some examples, during an engine shut-down operation, computer readable code can be used to retard ignition timing on at least one of a group of final combustion events during the shut-down to increase exhaust temperature thereby improving emissions on a subsequent engine re-start. In one example, upon receiving a command to shut-down the engine, one or several combustion events are still carried out, e.g., 1, 2, 3, 4, or a range of combustion events depending on operating conditions, e.g., 1-5, 1-3, 1-2, etc. By adjusting the ignition timing of at least some of these (e.g., the last one, the last two, one of the last two or three), it is possible to improve later re-starts that are performed before the catalyst has cooled. Further, as noted above, adjusting of exhaust (or intake) valve opening and/or closing timing (or lift) can also be used (or alternatively used) to further increase exhaust gas heat to the catalyst during a shut-down.

In step 216, valve timing is adjusted. Thus, upon indication of a request to stop or cylinder deactivation, intake and exhaust valve timing may be adjusted. The intake valve opening (IVO) can be moved, for example, to the engine position where a high intake port velocity is obtained, typically 45 degrees after the intake stroke begins. Moving the valve opening position to this location draws more fuel into the cylinder from the intake port puddle for a last combustion event. This can reduce the fuel puddle when the cylinder is deactivated or when the engine is stopped. Furthermore, a smaller fuel puddle contributes less fuel to a cylinder when the engine is restarted, thereby leading to more accurate air-fuel control during a start.

The valves can be operated with adjusted timing for at least an intake event, but may be operated longer if desired. Furthermore, the intake valve opening can be adjusted to a location of between 30 and 180 crank angle degrees after top-dead-center of the intake stroke. The intake valve closing timing can also be adjusted to compensate air charge differences that may result from adjusting intake valve opening timing.

The cylinder air-fuel mixture during engine shut-down may be lean, rich, or stoichiometric depending on control objectives.

In addition, the exhaust valves and spark advance may also be adjusted during engine shut-down. For example, exhaust valves are adjusted to an opening location of between 0 and 120 crank angle degrees after top-dead-center of the exhaust stroke. When this exhaust valve timing is combined with a spark angle adjustment, additional heat can be added to the catalyst prior to engine shut-down. As mentioned above, this can increase catalyst temperature in anticipation of a subsequent start. Further the exhaust valve closing timing can also be adjusted based on the adjusted exhaust valve opening time. The routine then proceeds to step 218 where fuel injection is then sequentially stopped for each cylinder after the final combustion event.

Then, the routine proceeds to step 220 and determines whether flow reduction and/or increased engine braking is requested. If not, the routine ends. If so, the routine proceeds to step 222 where valve opening/closing timing and duration can be adjusted, and/or valves may be held closed. For example, intake valves may be held open and exhaust valves held closed (of one or more, or all cylinders) to reduce flow through the exhaust. In another example, valve timing/duration may be adjusted to generate expansion or compression braking. For example, any one or more of the approaches described in U.S. Ser. No. 10/888,715, filed Jul. 8, 2004, attorney docket number 81099088, the entire contents of which is incorporated herein for all purposes, may be used. Examples of such operation are described in more detail in the examples below. For example, valve timing can be adjusted where the exhaust valve is held closed and the intake valve is opened near TDC and closed near BDC and then opened again near TDC to generate compression braking. In another example, valve timing can be adjusted where the exhaust valve is held closed and the intake valve is opened near BDC and closed near TDC and then opened again near BDC to generate expansion braking.

Thus, the above example describes some example situations where, prior to stopping an internal combustion engine, intake valve timing can be adjusted in a manner that improves starting the next time the engine is operated while at the same time stopping the engine faster. For example, opening the intake valves later in an intake stroke of a cylinder can reduce residual fuel left in an intake port after an engine is stopped. As a result, residual fuel from previous engine operation becomes a smaller fraction of the fuel entering the cylinder during a subsequent start. Consequently, the necessary amount of fuel injected to start the engine increases and the fuel injected becomes a greater fraction of the total amount of fuel entering a cylinder during a start. Because the mass of the fuel injected is known to a greater certainty than an estimate of residual fuel, a more consistent and higher accuracy air-fuel ratio may result during a start.

The present disclosure may provide several advantages. For example, the method can improve engine air-fuel ratio control and reduce emissions during a start since less residual fuel is present in the intake manifold when the engine is restarted. This can be especially advantageous when a catalyst is cold and its efficiency is low. In addition, less fuel is available to evaporate from the intake manifold, which can reduce evaporative emissions.

Referring now to FIGS. 3-8, various examples of operation are described. The sequences shown in FIGS. 3-8 are not actual engine data but are shown for illustration purposes and the actual number of events during an engine shut-down may be more or less than those illustrated.

Figure 3:
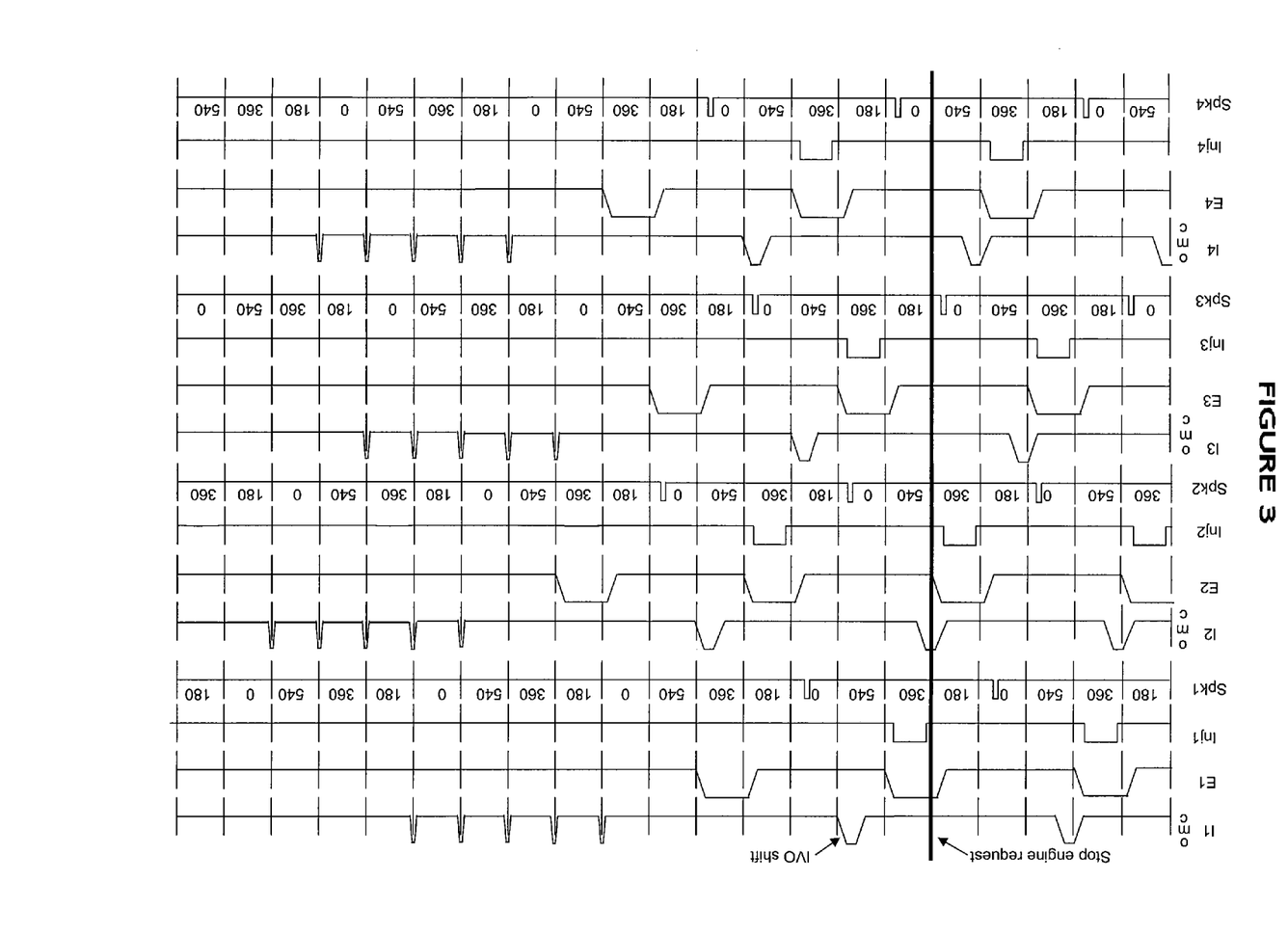
FIGS. 3-8 are plots of example valve timing during engine shutdown and/or cylinder deactivation.

FIG. 3 shows example intake and exhaust valve events, injection timing, and spark events for a four cylinder engine with adjustable intake and exhaust valve timing after a request to stop the engine is made. Each of the four piston positions is shown by angular degrees referenced to top-dead-center of the respective cylinder (i.e., 0 is top-dead-center of compression). A request to stop the engine is illustrated by the vertical line that divides engine events into two sections; pre-request and post-request. After a stop request has been made, intake valves are adjusted (denoted IVO shift) to a retarded position in an effort to reduce fuel that may be puddled in the intake manifold and/or cylinder head. After each cylinder inducts and combusts a final fuel amount, the exhaust valves open so that exhaust gases are expelled. Then, the exhaust valves are held in a closed position until engine speed is substantially zero (e.g., less than 100 RPM), when they are released to a neutral position. However, note that an additional combustion cycle in cylinder four may have been omitted because of the location of the stop request relative to the current cylinder stroke. That is, after a request to stop has been made, cylinders that have not been fueled may be deactivated, but this may cause the fuel puddle associated with that cylinder to remain in tact. After the exhaust valves are commanded to a closed position in a respective cylinder, the intake valves are opened near the top and bottom of subsequent piston strokes. By opening and closing the intake valves in this manner, compression and expansion work can be used to increase engine deceleration since little energy is recovered after expansion or compression. The illustrated sequence can reduce engine emissions because the amount of oxygen pumped to a catalyst during a stop is reduced. Also, the amount of exhaust gas trapped in a cylinder is reduced, which may improve engine restarts. Furthermore, the engine can stop quicker leading to fewer combustion events during a stop (i.e., fewer combustion events may lead to reduced fuel consumption and emissions). Moreover, by controlling expansion and compression work, the engine stop location may be better controlled. The number on intake compression/expansion relief valve events and the number of combustion events after IVO shift may be constant or may vary by engine operating conditions.

Alternatively, the exhaust valves may be held in a closed position after a final intake stoke in a respective cylinder.

Figure 4:
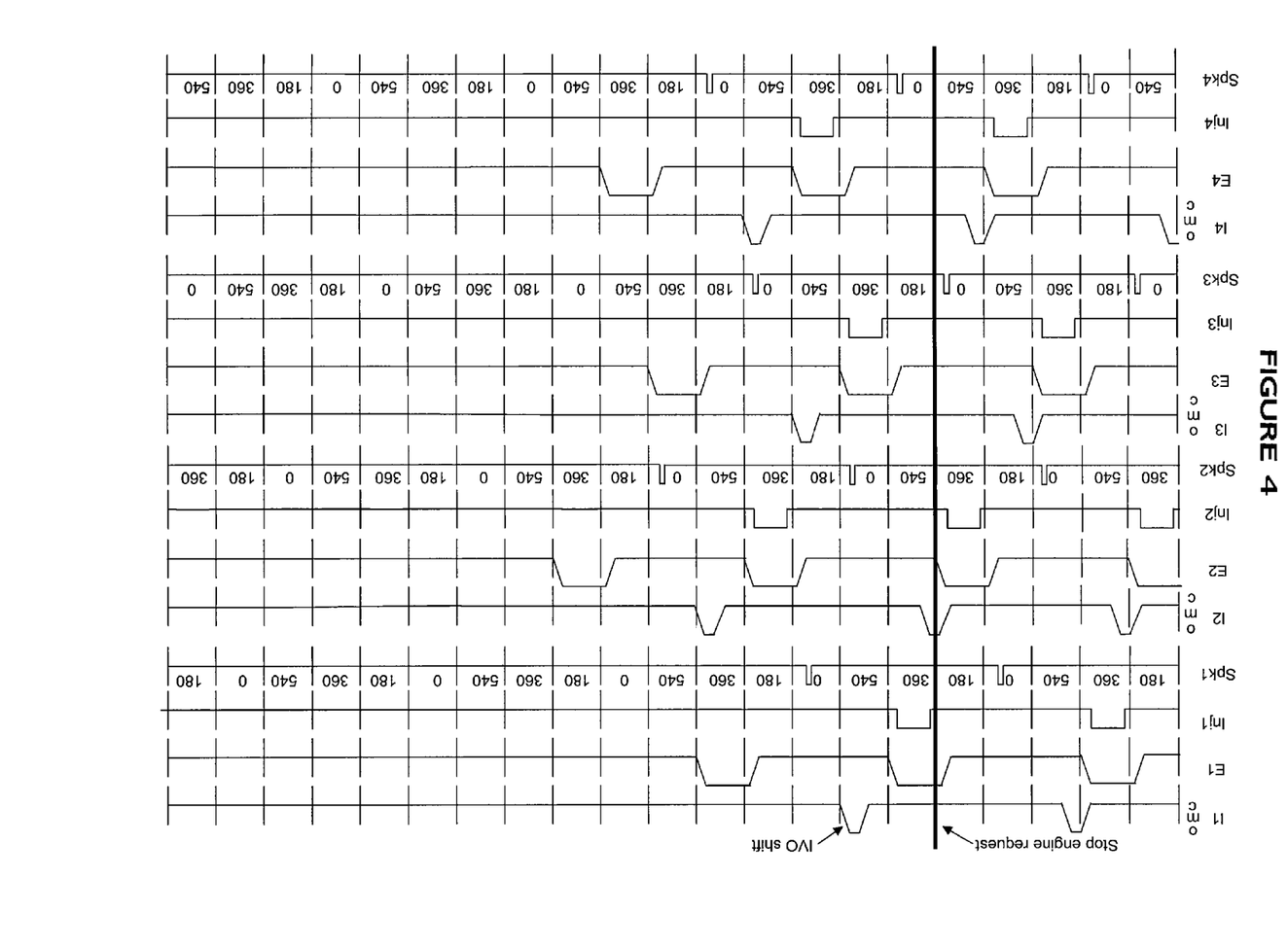

Referring now to FIG. 4, the sequence shown is similar to the sequence of FIG. 3, but the intake valves are held closed until the engine speed is substantially zero. By holding the intake valves closed, some compression and/or expansion work may be recovered so that the engine coastdown (i.e., time to reach zero speed from a request to stop) is increased. The benefits of the example of FIG. 4 are similar to those of the sequence of FIG. 3.

Alternatively, the exhaust valves may be held in a closed position (while intake valves operate or not) after a final intake stoke in a respective cylinder.

In yet another alternative, intake valves may be held closed while exhaust valves continue to operate after a final combustion event in the respective cylinder.

Figure 5:
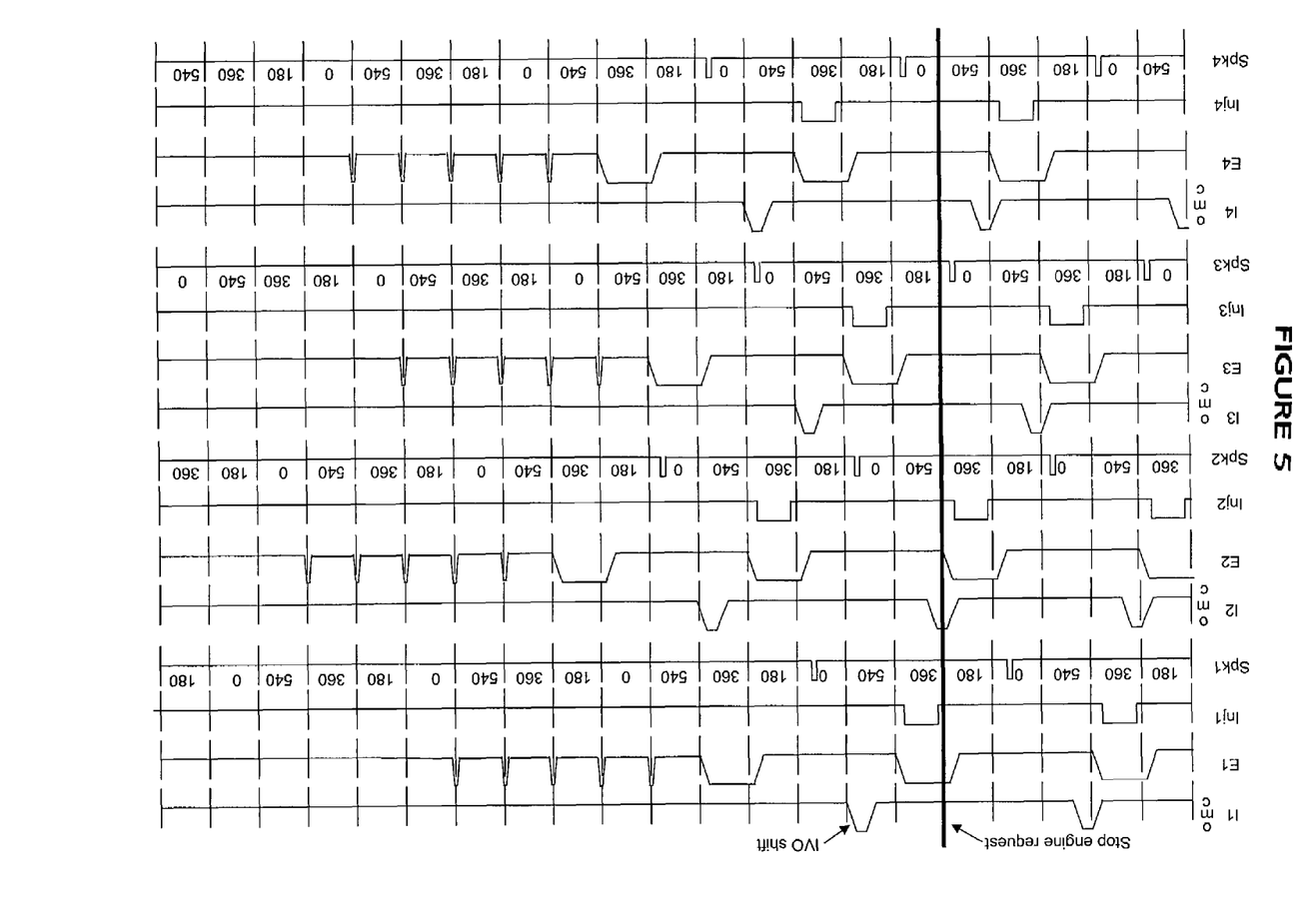

Referring now to FIG. 5, a sequence shown that is similar to the sequence of FIG. 4, but the exhaust valves are opened and closed until engine speed is substantially zero to increase engine expansion and compression work. As mentioned in the description of FIG. 5, opening and closing the exhaust valves near top-dead-center and bottom-dead-center can reduce energy recovery of compression and expansion. The benefits of the FIG. 5 sequence are similar to those of the sequence of FIG. 3.

Figure 6:
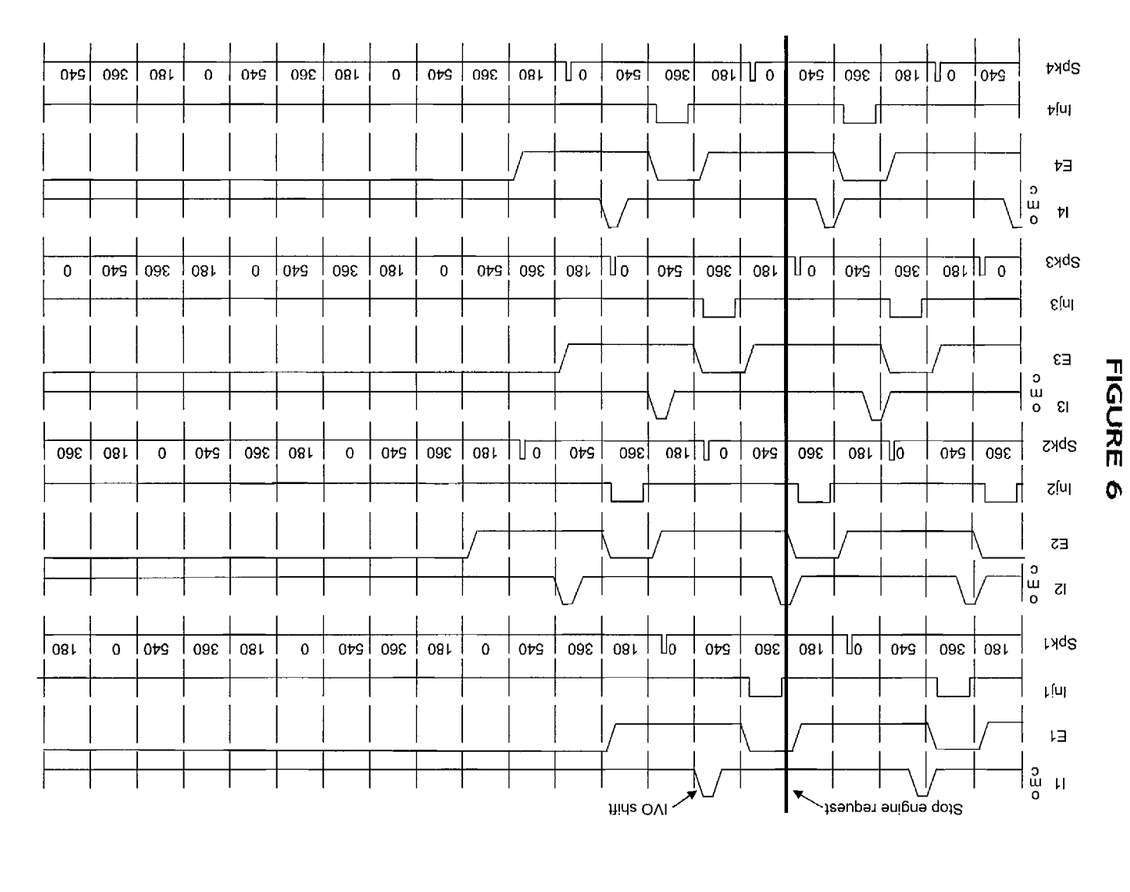

Referring now to FIG. 6, it shows a valve sequence that can reduce engine pumping work and catalyst oxidation during an engine shut-down. After an operator request to stop an engine, fuel and spark are customarily deactivated so that the individual cylinders do not continue to combust air-fuel mixtures. Even though spark and fuel have been deactivated, engine inertia can cause the engine to continue to rotate. If valve timing continues in the same manner as prior to the request to stop the engine (e.g., four stroke cycle), air may be pumped through the engine to a catalyst. An oxygenated catalyst (i.e., a catalyst with excess oxygen stored throughout or within a portion of a catalyst) may increase fuel consumption during a restart since additional fuel may be necessary to reset the state of the catalyst such that both oxidation and reduction may occur within the catalyst. By selectively operating intake and exhaust valves during shut-down and start-up catalyst oxidation may be reduced along with emissions and fuel consumption. Furthermore, intake and/or exhaust valves may be kept closed on a hybrid vehicle where an IC engine may be started and stopped a number of times during a normal drive. By keeping intake and/or exhaust valves closed during a soak period, oxidation caused by convective exhaust cooling, can be further decreased.

Continuing with FIG. 6, valve timing for a four-cylinder engine with valves that may be selectively activated during an engine shutdown is shown. After a request to stop the engine is made, IVO is shifted and a last combustion event occurs in each cylinder. As mentioned above, it is not necessary to have a final intake and combustion event for each cylinder if fuel puddling is of little or no concern. After a final combustion event in each of the respective cylinders, the exhaust valves are opened and remain open until engine speed is substantially zero, at which time the intake and exhaust valves are released to a neutral position. The intake valves remain closed after the final intake event until the engine speed is substantially zero. Allowing the exhaust valve to remain open during coast-down, while intake valves are closed, can reduce engine pumping work. The energy recovered by reducing engine pumping work may be captured by an electric motor or used to further propel a hybrid vehicle. By leaving intake valves closed and exhaust valves open, oxygen pumped through the engine during shut-down is reduced without increasing engine pumping work.

Alternatively, intake valves can be held open while exhaust valves are closed after the final combustion cycle is completed (i.e., after the exhaust valves close).

Figure 7:
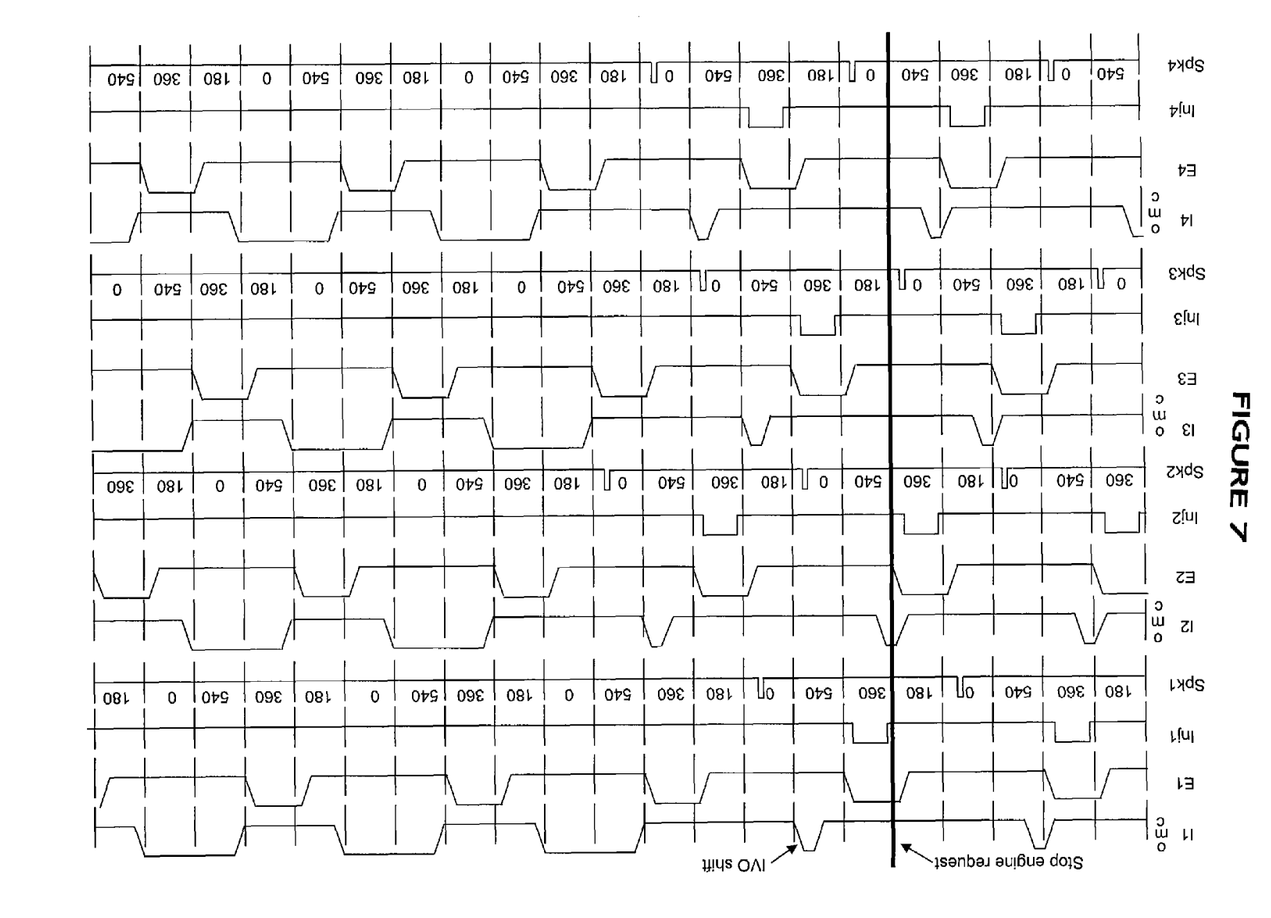

Referring now to FIG. 7, an alternate method to control intake and exhaust valves during an engine shut-down is shown. This method continues to operate both intake and exhaust valves after a request to stop the engine is made until engine speed is substantially zero, when the valves are released to a neutral position. After a final combustion cycle is completed in each respective cylinder, the intake valves are held open during a predetermined interval so that air flow through the engine is reduced. Namely, the intake valves are opened after the exhaust valves close (between −30 to +30 degrees after TDC exhaust stroke) and closed before the exhaust valves open (between −30 to +30 degrees after TDC compression stroke). The exhaust valve opens prior to the exhaust stroke and remains open until the end of the exhaust stroke. Of course, small variations in valve timing, different from those illustrated, may be used without deviating from the intent to reduce pumping work and air flow through the engine.

Alternatively, a partial number of cylinders may complete a fueled intake stroke after the request to stop the engine is made so that the shut-down sequence begins sooner.

Figure 8:
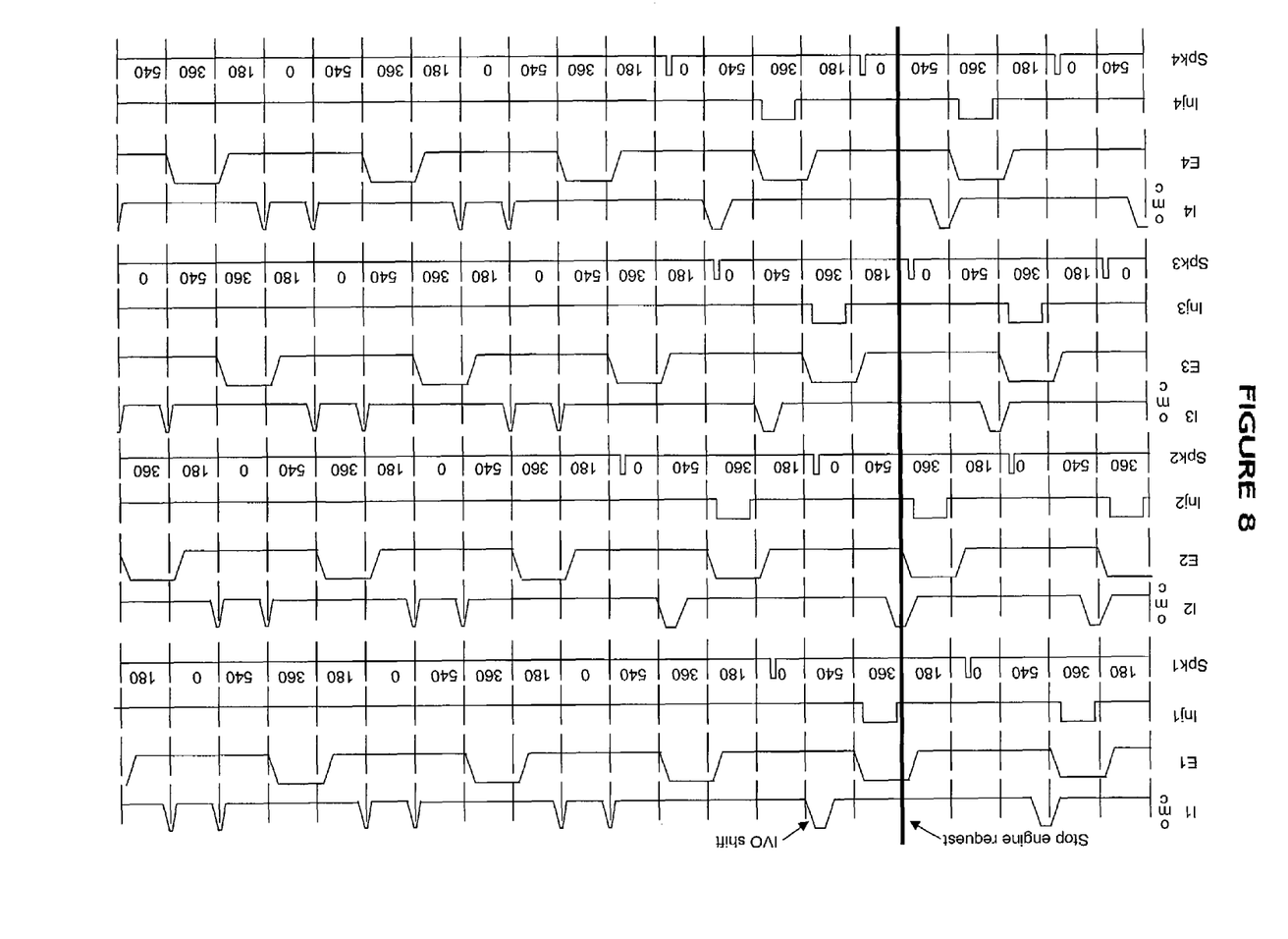

Referring now to FIG. 8, another alternate method to control intake and exhaust valves during an engine shut-down is shown. This method continues to operate both intake and exhaust valves after a request to stop the engine is made until engine speed is substantially zero, when the valves are released to a neutral position. After a final combustion cycle is completed in each respective cylinder, the intake valves are held closed except near (±30 degrees) BDC intake and TDC compression strokes where they are opened to release expansion or compression work. The exhaust valve opens prior to the exhaust stroke and remains open until the end of the exhaust stroke. Of course, small variations in valve timing, different from those illustrated, may be used without deviating from the intent to increase pumping work and decrease air flow through the engine. Further, the opening/closing times may be adjusted to vary the amount of braking torque generated. The sequence may be used to quickly stop engine rotation while reducing air flow through the engine. This may be beneficial to reduce engine emissions and to reduce perceived engine run-on.

A final combustion event in each cylinder of the engine is not necessary for any of the above sequences. Some cylinders may initiate a valve timing change immediately following the request to stop the engine.

The approach of FIGS. 7-8 may be especially advantages for systems with electrically actuated intake valves and mechanically cam actuated exhaust valves, for example.

Note that the above approaches can be combined with engine starting approaches that further reduce flow through the exhaust system. For example, one or more intake and/or exhaust valves can be held closed for one or more cycles during engine starting and/or cranking. For example, exhaust valves may be held closed until a first combustion event in the cylinder.

It will be appreciated that the configurations and routines disclosed herein are exemplary in nature, and that these specific embodiments are not to be considered in a limiting sense, because numerous variations are possible. For example, the above approaches can be applied to V-6, I-4, I-6, V-12, opposed 4, and other engine types. Also, the approaches described above are not specifically limited to a dual coil valve actuator. Rather, it could be applied to other forms of actuators, including ones that have only a single coil per valve actuator, and/or other variable valve timing systems, such as, for example, cam phasing, cam profile switching, variable rocker ratio, etc.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

I claim:

1. A method for discontinuing combustion in a cylinder of an internal combustion engine having an intake manifold and an emission control device coupled downstream of thereof, where the cylinder has at least one valve, the method comprising:

during a shut-down and after a final combustion event in the cylinder, adjusting valve timing of the valve to reduce a flow of gasses from the engine to the emission control device.

2. The method of claim 1 further comprising maintaining another valve in a closed position during said shut-down and after the final combustion event.

3. The method of claim 2 further comprising during conditions where the another valve is in said closed position, operating with the valve open, then closing the valve, and then opening the valve to generate braking torque to slow the engine.

4. The method of claim 1 where said valve is an intake valve.

5. The method of claim 1 where said valve is an exhaust valve.

6. The method of claim 5 further comprising opening the exhaust valve to expel combustion gasses of the final combustion event, and then holding the exhaust valve closed until engine speed is at least less than 100 rpm, and then releasing the exhaust valve to a neutral position.

7. The method of claim 6 where an intake valve is held closed after the final combustion event.

8. The method of claim 5 where the intake valve timing is adjusted to extend an intake valve opening duration.

9. The method of claim 5 where the intake valve timing is adjusted to retard an intake valve closing timing.

10. The method of claim 5 where the intake valve timing is adjusted, where the intake valve opens after an exhaust valve of the cylinder closes.

11. The method of claim 5 where the intake valve timing is adjusted so the intake valve opens between −30 to +30 degrees after TDC exhaust stroke and closes between −30 to +30 degrees after TDC compression stroke.

12. The method of claim 1 further comprising, after the final combustion event, holding one of an intake and exhaust valve open while holding the other of the intake and exhaust valve closed during a plurality of piston cycles of the cylinder, until the engine speed falls below a threshold and both the intake and exhaust valve are released to a neutral position.

13. A method for discontinuing combustion in a cylinder of an internal combustion engine having an intake manifold and an emission control device coupled downstream of thereof, where the cylinder has at least one electrically actuated intake valve, the method comprising:

during a shut-down and after a final combustion event in the cylinder, adjusting valve timing of the intake valve to reduce a flow of gasses from the engine to the emission control device, where the intake valve opening duration is increased.

14. The method of claim 13 further comprising releasing the intake valve to a neutral position at least after engine speed falls below 100 RPM.

15. The method of claim 13 where the intake valve timing is adjusted so that intake valve opens after an exhaust valve of the cylinder closes from exhausting gasses from the final combustion event.

16. The method of claim 13 where the intake valve timing is adjusted so the intake valve opens between −30 to +30 degrees after TDC exhaust stroke and closes between −30 to +30 degrees after TDC compression stroke.

* * * * *